United States Patent
Chutorash

Patent Number: 6,166,460
Date of Patent: Dec. 26, 2000

[54] ELECTRICAL JUNCTION BOX HAVING A REPLACEABLE CONTROLLER

[75] Inventor: Richard J. Chutorash, Rochester Hills, Mich.

[73] Assignee: Lear Automotive Dearborn, Inc., Southfield, Mich.

[21] Appl. No.: 09/236,016

[22] Filed: Jan. 22, 1999

[51] Int. Cl.[7] .................................................. H01H 9/54
[52] U.S. Cl. ............................................ 307/139; 307/147
[58] Field of Search .................................... 307/139, 140, 307/143, 147; 361/819, 626

[56] References Cited

U.S. PATENT DOCUMENTS

| | | | |
|---|---|---|---|
| 5,003,430 | 3/1991 | Vonarx et al. | 361/395 |
| 5,428,535 | 6/1995 | Katsumata et al. | 364/424.05 |
| 5,889,337 | 3/1999 | Ito et al. | 307/10.1 |

FOREIGN PATENT DOCUMENTS 42 27 182 C1  2/1993  Germany .
197 24 254 A1  8/1998  Germany .

Primary Examiner—Josie Ballato
Assistant Examiner—Robert L. DeBeradinis
Attorney, Agent, or Firm—Brooks & Kushman P.C.

[57] ABSTRACT

An electrical junction box for a vehicle includes a housing and a circuit disposed in the housing for receiving power from a remote power source. At least one power switching device is electrically connected to the circuit for switching power from the power source to a remote electrically-actuated device in the vehicle. A controller operates the at least one switching device. The junction box is characterized by the controller being removably connected to the circuit. In a first version, the controller is packaged in a protective case separate from the junction box housing. In a second version, the controller is accessibly packaged within the electrical junction box housing. Both embodiments accomplish one object of the present invention to provide a controller for an electrical junction box which is easily and quickly removable for service repair or replaceable for micro-processor chip upgrade.

6 Claims, 2 Drawing Sheets

ELECTRICAL JUNCTION BOX HAVING A REPLACEABLE CONTROLLER

BACKGROUND OF THE INVENTION

This invention relates to an electrical junction box for a vehicle having a replaceable controller.

Some modern vehicles have an electrical architecture which includes one or more electrical junction boxes. An electrical junction box is used primarily to control high current electrical devices, i.e. devices requiring one or more amps of current. To control such devices, an electrical junction box includes one or more switching devices, such as relays and/or fuses, which switch power from a remote power supply to the high current electrical devices.

Some electrical junction boxes include a micro-processor based controller for operating the switching devices. In the prior art junction boxes, the controller is integrated with the junction box. In other words, the controller cannot be removed from the junction box. As a result, prior art junction boxes have several shortcomings. Foremost, the controller alone cannot be removed for service or replaced for micro-processor chip upgrade. Further, the controller cannot be updated at a later time, e.g. when the vehicle is returned at the end of a lease, to upgrade the optional electrical accessory content of the vehicle.

SUMMARY OF THE INVENTION

In a disclosed embodiment of this invention, an electrical junction box for a vehicle includes a housing and a circuit disposed in the housing for receiving power from a remote power source. At least one power switching device is electrically connected to the circuit for switching power from the power source to a remote electrically-actuated device in the vehicle. A controller operates the at least one switching device. The junction box is characterized by the controller being removably connected to the circuit.

In a first embodiment of this invention, the controller is packaged in a protective case separate from the electrical junction box housing. In a second embodiment of this invention, the controller is accessibly packaged within the electrical junction box housing adjacent an access door. Both embodiments provide a controller for an electrical junction box which is easily and quickly removable for service or replaceable such as for micro-processor chip upgrade.

These and other features of the present invention will be best understood from the following specification and drawings, the following of which is a brief description.

DETAILED DESCRIPTION OF THE PREFERRED EMBODIMENT

Figure 1:
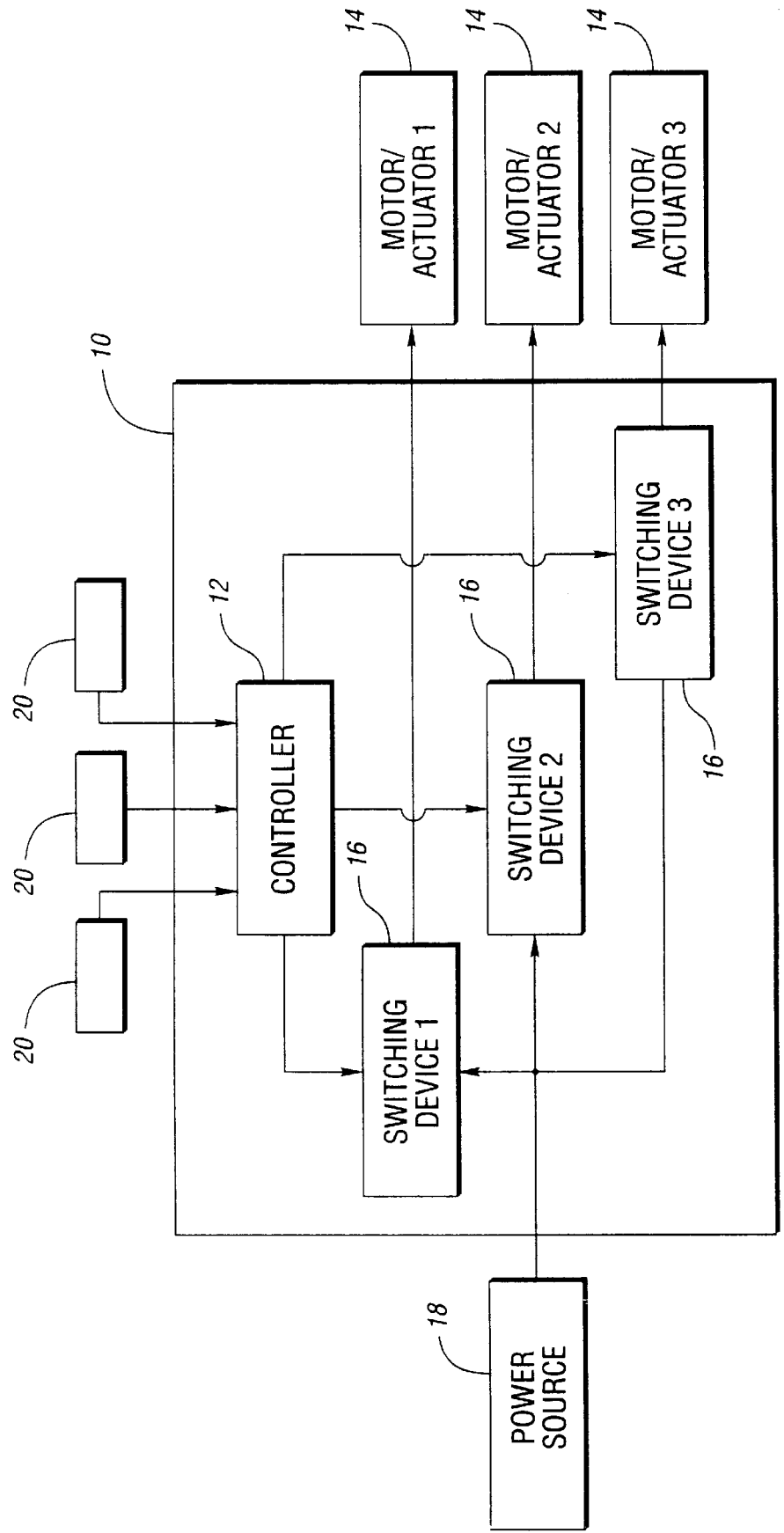
FIG. 1 is a schematic block diagram of an electrical junction box having a removable controller in accordance with the present invention.

FIG. 1 is a schematic block diagram of an electrical junction box 10 having a removable controller 12 in accordance with the present invention. The electrical junction box 10 is used primarily to control high current electrical devices 14, i.e. devices requiring one or more amps of current. The high current electrical devices 14 typically include window motors, door lock actuators, and/or other similar types of electrical components located in a vehicle.

To control the high current electrical devices 14, the electrical junction box 10 includes one or more switching devices 16. The switching devices 16 switch power from a remote power supply 18, such as a battery, to the high current electrical devices 14. The switching devices 16 typically include relays, fuses, power transistors, and/or other similar types of power switching components known in the art.

The controller 12 is used primarily to operate the switching devices 16. To accomplish this task, the controller 12 receives input signals from input switches 20 and, in response, produces and transmits control signals to the switching devices 16. The input switches 20 typically include window switches, door lock switches, and other similar operator-controlled input switches located throughout a vehicle. The controller 12 typically includes a microprocessor.

In keeping with the spirit of the present invention to provide an electrical junction box 10 having an easily removable controller 12, there are numerous ways in which the controller 12 may be adapted to quickly attach to and detach from the junction box 10. Accordingly, the following embodiments are included for illustrative purposes only and are not intended to limit the scope of the present invention. In a first embodiment of this invention, the controller 12 is packaged in a protective case separate from the electrical junction box housing. In a second embodiment of this invention, the controller 12 is accessibly packaged within a electrical junction box housing adjacent an access door. Both embodiments provide a controller 12 for an electrical junction box 10 which is easily and quickly removable for service or replaceable such as for micro-processor chip upgrade.

Figure 2A:
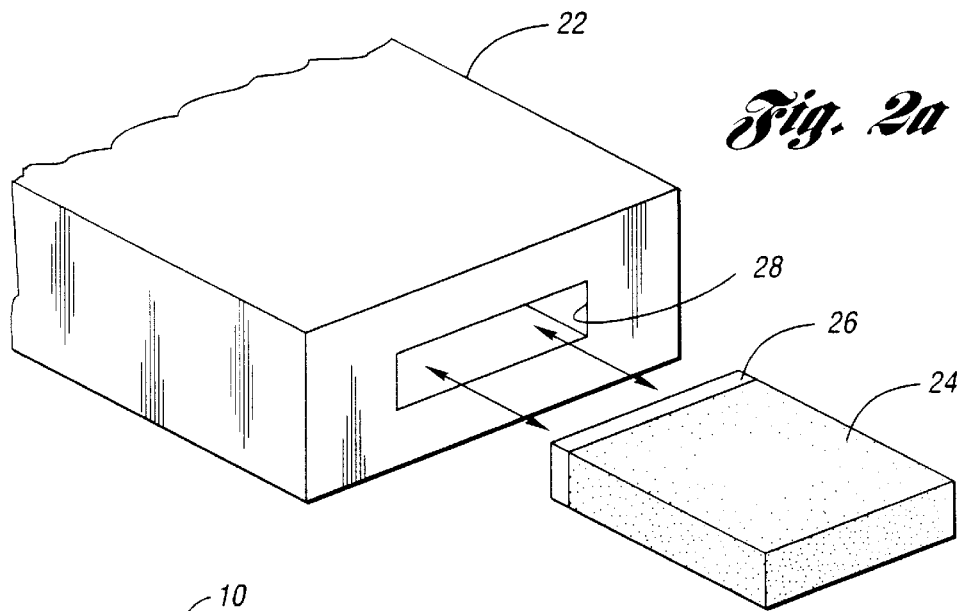
FIG. 2A is a perspective view of a first embodiment of the present invention with the electrical junction box packaged in a housing and the controller housed in a separate protective case.

FIG. 2A is a perspective view of the first embodiment of the present invention with the electrical junction box 10 packaged in a housing 22 and the controller 12 housed in a separate case 24. In this first embodiment, the controller 12 and its components are protected in the case 24. A quick releasing connector 26 extends from one end of the case 24. The quick releasing connector 26 connects the controller 12 and its components to the junction box circuit 27 packaged in the housing 22. The case 24 may have a cartridge-type design, as illustrated in FIG. 2A, thereby allowing the controller 12 to be easily plugged into or removed from the junction box housing 22. Accordingly, the junction box housing 22 includes a receptacle portion 28 for receiving the protective case 24 of the controller 12 and providing access for the controller 12 to connect with the junction box circuit 27 packaged in the junction box housing 22 via the quick releasing connector 26.

Figure 2B:
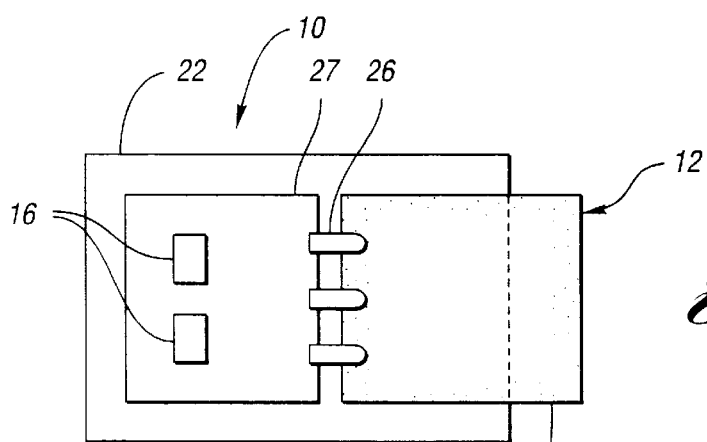
FIG. 2B is a top schematic view of the first embodiment of the present invention with a top portion of the junction box housing broken away to show the controller connected to a junction box circuit via a quick releasing connector.

FIG. 2B is a top schematic view of the first embodiment of the present invention with a top portion of the housing 22 broken away to show the controller 12 connected to the junction box circuit 27 via the quick releasing connector 26. The mating electrical connections are complete when the case 24 is inserted into the receptacle portion 28 of the junction box 10 and the quick releasing connector 26 connects the junction box circuit 27, including the switching devices 16, to the controller 12, as schematically shown in FIG. 2B. The electrical connections may be as known in the art for plug-in type connectors. Thus, in the first embodiment of the present invention, the controller 12 is housed in a cartridge-type case 24 which is easily and quickly removable from the electrical junction box 10 for service or replaceable such as for micro-processor chip upgrade.

Figure 3:
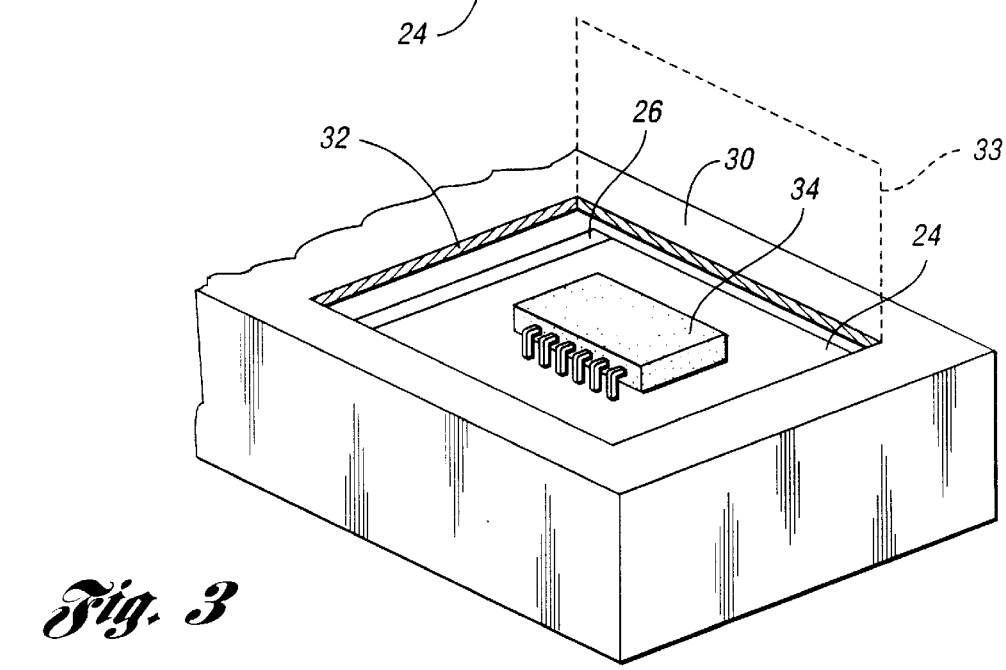
FIG. 3 is a perspective view of a second embodiment of the present invention with the electrical junction box and the controller packaged in a single housing.

FIG. 3 is a perspective view of the second embodiment of the present invention with the electrical junction box 10 and the controller 12 packaged in a single housing 30. In this second embodiment, the controller 12 and its components are protected by the single housing 30. To access the controller 12 and its components, the housing 30 may be a two-piece design allowing the housing 30 to be opened and thereby exposing the controller 12 and its components. Alternatively, the housing 30 may include an access opening 32, as illustrated in FIG. 3. When not in use, the access opening 32 may be covered with a door 33, shown in phantom lines. When the door 33 is opened, as illustrated in FIG. 3, the controller 12 and its micro-processor 34 may easily be accessed via the access opening 30. The quick releasing connector 26 allows the controller 12 and its components to be easily removed from the housing 30. Thus, in the second embodiment of the present invention, the controller 12 is accessibly packaged within the housing 30 thereby allowing the controller 12 to be easily and quickly removed for service or replaced such as for micro-processor chip upgrade.

The present invention further provides a method for exchanging a controller connected to an electrical junction box circuit disposed within a junction box housing. As will be appreciated by one of ordinary skill in the art, although the method is described in sequential steps, the particular order of processing is not important to achieving the objects of the present invention. The method include the steps of: disconnecting a first controller from the junction box circuit; removing the first controller from the junction box housing; inserting a second controller into the junction box housing; and connecting the second controller to the junction box circuit.

In a first embodiment of the method, the first controller is housed within a first protective case, the second controller is housed within a second protective case, and the junction box housing includes a receptacle for receiving either protective case. In this first embodiment, the step of removing the first controller from the junction box housing is further defined as pulling the protective case of the first controller from the receptacle in the junction box housing, and the step of inserting the second controller into the junction box housing is further defined as plugging the protective case of the second controller into the receptacle in the junction box housing.

In a second embodiment of the method, the first controller is accessibly packaged within the junction box housing adjacent an access door. In this second embodiment, the method includes the step of opening the access door to provide an access opening prior to the step of disconnecting the first controller. The method also includes the step of closing the access door to cover the access opening after the step of connecting the second controller. Accordingly, the step of removing the first controller is further defined as removing the first controller from the junction box housing through the access opening, and the step of inserting a second controller is further defined as inserting a second controller into the junction box housing through the access opening.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. An electrical junction box for controlling a high current electrical device by selectively connecting a remote power source to the electrical device, the junction box comprising:
   a housing;
   a programmable controller; and
   a control circuit including at least one power switching device within the housing and in communication with the controller and selectively connecting the power source to the electrical device upon demand by the controller wherein the
   controller is removably connected to the control circuit.

2. An electrical junction box as set forth in claim 1 wherein the controller is connected to the control circuit with a quick releasing connector.

3. An electrical junction box as set forth in claim 1 wherein the controller is disposed within the housing.

4. An electrical junction box as set forth in claim 3 wherein the controller is accessible in the housing.

5. An electrical junction box as set forth in claim 1 wherein the controller is disposed in a protective case.

6. An electrical junction box as set forth in claim 5 wherein the housing includes a receptacle portion for receiving the protective case of the controller and providing access for the controller to connect to the control circuit.

* * * * *